G. E. FRETZ.
MOTOR CYCLE ATTACHMENT.
APPLICATION FILED AUG. 25, 1917.
1,267,999.
Patented May 28, 1918.
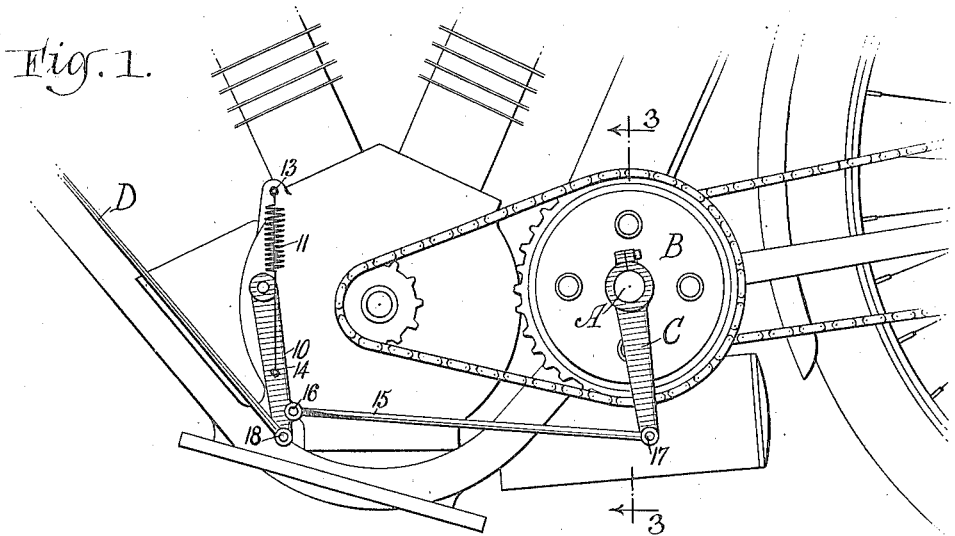
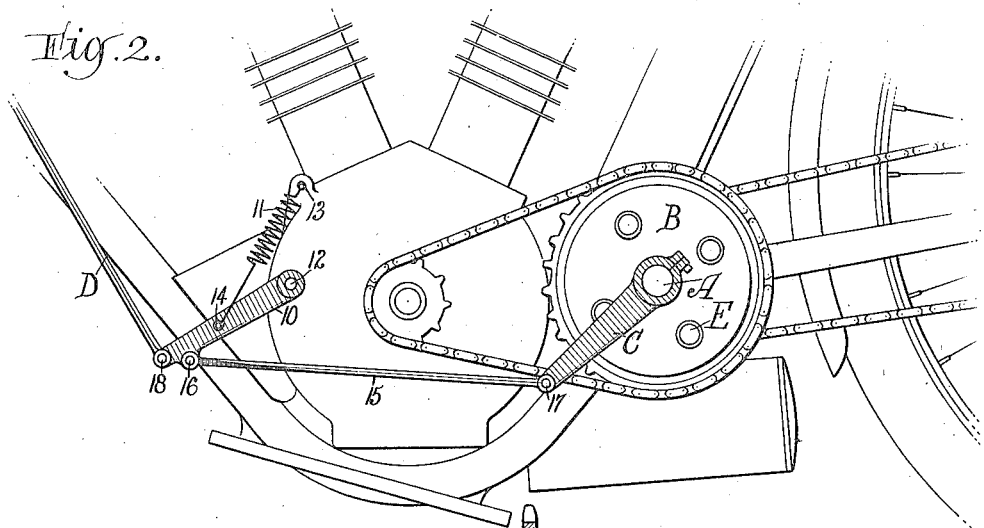
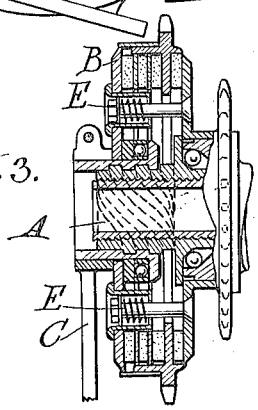
WITNESSES
INVENTOR
G. E. Fretz
BY
ATTORNEYS

UNITED STATES PATENT OFFICE.

GLEN E. FRETZ, OF PRATT, KANSAS.

MOTOR-CYCLE ATTACHMENT.

1,267,999.   Specification of Letters Patent.   Patented May 28, 1918.

Application filed August 25, 1917. Serial No. 188,144.

*To all whom it may concern:*

Be it known that I, GLEN E. FRETZ, a citizen of the United States, and a resident of Pratt, in the county of Pratt and State of Kansas, have invented a new and Improved Motor-Cycle Attachment, of which the following is a full, clear, and exact description.

My invention while useful in other situations is more particularly intended for use on a motor cycle for controlling the clutch.

In the operation of a motor cycle it is often desirable to maintain the clutch in a partially engaged position whereas the tendency of the clutch springs is to throw the clutch to the extreme position of engagement. A friction lock has been proposed, which, however, possesses the disadvantage that if it is set tight it makes the clutch hard of operation and if set loose, the clutch has a tendency to be jarred into the position of full engagement.

It is an object of my invention to provide a controlling means associated with the clutch lever and its actuating lever and arranged to counterbalance the increasing spring pressure exerted by the clutch spring when the clutch is moved away from the engaged position, so that the clutch will be maintained in any given position including that of partial engagement for example.

Reference is to be had to the accompanying drawings forming a part of this specification in which similar reference characters indicate corresponding parts in all the views, it being understood that the drawings are merely illustrative of one example of the invention.

Figure 1 is a side elevation of a portion of a motor cycle equipped with my invention, showing the clutch lever in the position it assumes when the clutch is in full engagement;

Fig. 2 is a similar view showing the clutch lever and the parts of my attachment in the positions assumed when the clutch is moved away from the position of full engagement;

Fig. 3 is a transverse vertical section through the clutch of the motor cycle on the line 3—3, Fig. 1.

In the illustration, parts of a known type of motor cycle are shown including a driven shaft A having a disk clutch designated generally by the letter B; C indicates the clutch lever which is operated in any suitable manner, there being shown a portion of an operating lever D, and E indicates clutch springs, normally tending to hold the clutch in full engagement, the clutch being adapted to be moved away from the position of full engagement in opposition to the springs E by the rocking of the clutch lever C.

In carrying out my invention in accordance with the illustrated example, a controlling lever 10 is provided and arranged to partake of the movements of the clutch lever C and operating lever D. The said lever 10 is subject to a counteracting spring 11, the lever being fulcrumed at one end as at 12 on any fixed part, and the spring 11 being secured at one end as at 13 to a fixed part and connected at its other end as at 14 with the lever 10 between the ends of the latter. A connecting rod 15 is pivotally connected at one end as at 16 with the controlling lever 10 near the end opposite the fulcrum 12, said connecting rod being pivotally connected at its opposite end as at 17 with the clutch lever C. The lever 10 is connected also, preferably at its extreme free end, as at 18 with the operating lever D so that the connecting rod 15 and the lever 10 establish connection between the clutch lever C and the operating lever D to thereby cause said lever 10 to partake of the movements of the levers C and D.

The normal tendency of the springs E is to maintain the clutch B in full engagement at which time the lever C is in the position as indicated in Fig. 1, and the lever 10 is then in position with the spring 11 on the center or slightly at a side of the center of the said lever 10, so that the said spring 11 has zero tendency to swing the lever 10 in a direction to act on the lever C in opposition to the clutch springs E. When, through the medium of the operating lever D or its equivalent, the clutch lever C is swung to the left as in Fig. 2, to throw the clutch away from the position of full engagement, the controlling lever 10 will have a corresponding movement, thereby varying the angular relation of said lever 10 and the spring 11 so that with the swinging of the lever 10 to the left, the spring 11 exerts a gradually increasing force on the lever 10 by acting thereon through an increasing leverage as will be obvious, the force of the spring 11 thus being in opposition to the force exerted by the spring E on the clutch, thereby counterbalancing the clutch springs leaving the clutch without any positive spring force tending to restore it to the original clutched position. It will be obvious therefore that the counteracting spring 11 serves to maintain the clutch in any given position, including that of partial engagement and overcoming any tendencies of acting to restore the clutch to the position of full engagement.

I wish to state in conclusion that although the illustrated example constitutes a practical embodiment of my invention, I do not limit myself strictly to the mechanical details herein illustrated, since manifestly the same can be considerably varied without departure from the spirit of the invention as defined in the appended claim.

Having thus described my invention, I claim as new, and desire to secure by Letters Patent:

The combination with a driven shaft, a spring pressed disk clutch associated with said shaft, a clutch lever, and an operating lever for said clutch lever, of a controlling lever fulcrumed at one end on a relatively fixed support and connected at the opposite end with the operating lever, a connecting rod establishing connection between the said controlling lever and the clutch lever, and a spring secured at one end to a relatively fixed support and connected at its opposite end with the controlling lever between the ends of the latter, the said spring being movable with the controlling lever in response to movements of the clutch lever and operating lever to a position to exert zero force on the controlling lever when the clutch lever is in position for extreme clutch engagement, said spring being adapted to exert its force on the controlling lever through an increasing lever arm as the said controlling lever is moved by a releasing movement of the clutch element.

GLEN E. FRETZ.